F. L. BRADLEY.
POWER SAW.
APPLICATION FILED JULY 9, 1912.
1,035,524.
Patented Aug. 13, 1912.
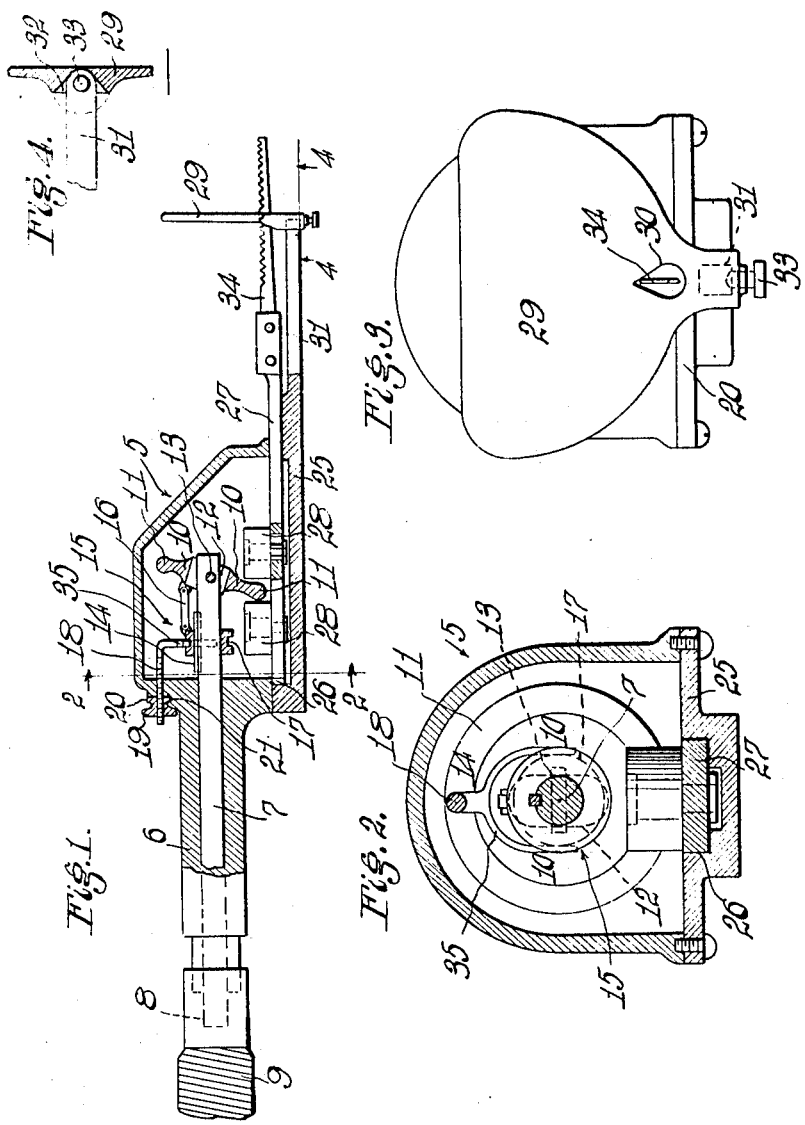
Witnesses
Inventor,
Fred L Bradley
by his Attorney

UNITED STATES PATENT OFFICE.

FRED L. BRADLEY, OF LOS ANGELES, CALIFORNIA.

POWER-SAW.

1,035,524.

Specification of Letters Patent.  Patented Aug. 13, 1912.

Application filed July 9, 1912. Serial No. 708,535.

*To all whom it may concern:*

Be it known that I, FRED L. BRADLEY, a citizen of the United States, residing at Los Angeles, in the county of Los Angeles, State of California, have invented new and useful Improvements in Power-Saws, of which the following is a specification.

This invention relates to the class of power saws more commonly known as scroll or jig saws, and it consists primarily in a novel application of a mechanical movement in such a manner as to provide a saw in which various difficulties heretofore encountered are completely obviated.

One of the advantages of the present machine is the provision of a simple mechanism for the lengthening and shortening of the stroke of the saw, this being accomplished through the medium of a thumb nut while the machine either is running or stationary. The method of adjusting the stroke is such that practically the same quantity of power is at the disposal of the saw on a short stroke as on a long stroke. The reciprocating frequency remaining the same, it is obvious that the saw will pull heavier on a short stroke and will therefore cut through heavier material than is possible on the long stroke. On the other hand, the long light stroke admits of extremely fast work in light easily cut material.

Another of the salient features of the device is the relative arrangement of the power shaft and the saw blade, this arrangement being facilitated by the peculiar mechanical movement used to connect the shaft with the saw. In most of the power saws of this class now in use the shaft is journaled at right angles to the saw, so that the flexible power shaft usually used to supply power to the machine extends radially from the axis about which the saw blade must be turned in order to cut curved figures in the work. If the saw is turned through a complete revolution the shaft is correspondingly twisted and the saw must be removed from the work and turned back to its initial position. In the present device the flexible power shaft extends with its axis parallel to the length of the saw and any turning of the saw does not twist the shaft, but merely affects its position rotationally with reference to the stationary part of the machine.

In the accompanying drawings: Figure 1 is a longitudinal section showing the construction of the device. Fig. 2 is an enlarged section taken on line 2—2 of Fig. 1. Fig. 3 is an enlarged end view taken from the right hand end of Fig. 1. Fig. 4 is an enlarged section taken on line 4—4 of Fig. 1.

Referring now particularly to the drawings, 5 designates a case of suitable construction which also forms the central frame work of the machine. This case is provided with a circular handle member 6 extending from one end, the handle being hollow for the accommodation of shaft 7 therein. Shaft 7 extends beyond the end of the handle as at 8 and is connected in any suitable manner to a flexible shaft 9 through which power is supplied to the machine. The direction of rotation of the shaft is of no consequence.

Mounted on the inner end of shaft 7 inside of casing 5 is a disk 10 having a rim 11 of circular cross section. This disk is mounted on the shaft in a peculiar manner, not being rigidly secured thereto. A slot 12 in the disk encircles shaft 7, the slot being of such a configuration as shown in Fig. 2, that its longitudinal walls fit tightly against the shaft, while it allows of some play of the disk on the shaft in the direction longitudinal of the slot. A pin 13 is passed centrally through shaft 7 and into the disk in the position relative to the slot shown in Fig. 2, the disk being thus rotationally affixed to the shaft and also being allowed an oscillatory movement around the axis of pin 13.

Mounted on shaft 7, and affixed thereto by means of a feather 14 allowing its longitudinal movement on the shaft and compelling the rotational movement therewith, is a collar 15 connected by means of a link 16 to disk 10 at a point adjacent to one of the ends of slot 12. The collar is moved along the shaft through the medium of a small yoke 35 engaging with a groove 17 in its outer face, the yoke being mounted on a screw threaded rod 18 which projects out through case 5 and is provided with a thumb nut 19 on its outer end. The thumb nut has a collar 20 which fits into a small notch 21 in the outer surface of the case so that the nut is held stationary longitudinally of rod 18, being rotated to screw the rod in either direction. Through this means the disk 10 may be tilted at any angle, within limits, on the shaft.

Mounted on the lower part of casing 5 and closing its otherwise open bottom is a member 25 having in it a longitudinal slot 26 in which reciprocating bar 27 is mounted. This bar is provided with two rollers 28 mounted thereon and projecting upwardly, one on each side of circular rim 11 of the disk. On account of the circular cross section of the rim, the horizontal distance occupied by it in its different angular positions between the rollers is always constant. The rollers may therefore be set closely on the rim, avoiding any possible lost motion. This could not be true of a rim having any but a circular cross section. By reducing the angle of inclination between the disk and a plane normal to the shaft the amount of movement of bar 27 may be reduced, this movement being reduced to nothing when the disk is placed at right angles to the shaft, or in the normal plane. Mounted on the outer end of bar 27 is a saw blade 34 of usual configuration. This saw blade projects through a foot plate 29, pointed opening 30 being provided therein for that purpose. This foot plate is mounted on the end of an extension 31 of member 25 as is shown clearly in Figs. 3 and 4. The end of the extension is rounded off and projects into a V-shaped opening 32 in the foot plate. A set screw 33 is mounted on the part of the foot plate inclosing the end of the extension and projects into the extension as indicated in Fig. 3, the screw being on the axis of the rounded end of the extension so that the foot plate may be turned in the directions indicated by the double headed arrow in Fig. 4 and set in any desired position by the screw. This angular setting of the foot plate renders it possible to cut material uniformly at any desired angle.

Having described my invention, I claim:

1. A power saw, comprising a frame, a shaft journaled in the frame, a reciprocating member mounted in the frame, the line of reciprocation being parallel to the shaft axis, mechanism whereby the member is reciprocated upon the rotation of the shaft, saw mounting means on the end of the reciprocating member, and a foot plate pivotally mounted on the frame and having an aperture for the passage of the saw, the pivotal axis of the plate being in the plane of a cut made by the saw.

2. A power saw, comprising a frame, a shaft journaled in the frame, flexible shaft connecting means on the outer end of the shaft, a reciprocating member mounted in the frame, the line of reciprocation being parallel to the axis of the shaft, mechanism whereby the member is reciprocated when the shaft is rotated, an extension on the frame, and a foot plate pivotally mounted on the extension and having an aperture therein for the passage of the saw, the pivotal axis of the plate being in the plane of cut of the saw.

In witness that I claim the foregoing I have hereunto subscribed my name this 1st day of July 1912.

FRED L. BRADLEY.

Witnesses:
  ELWOOD H. BARKELEW,
  JAMES T. BARKELEW.